US00RE37566E

(19) United States
(12) Reissued Patent
Cristea et al.

(10) Patent Number: US RE37,566 E
(45) Date of Reissued Patent: Mar. 5, 2002

(54) HOLDING DEVICE FOR COLLECTING RESIDUAL CONTENTS IN A CONTAINER

(76) Inventors: Denise M. Cristea; Mary A. Marszalek, both of 1810 Bellemeade Dr., Clearwater, FL (US) 33755-2201

(21) Appl. No.: 09/697,589

(22) Filed: Oct. 26, 2000

Related U.S. Patent Documents

Reissue of:
(64) Patent No.: 5,950,698
Issued: Sep. 14, 1999
Appl. No.: 09/127,520
Filed: Jul. 31, 1998

(51) Int. Cl.[7] ..... B65B 1/04
(52) U.S. Cl. ..... 141/98; 141/86; 141/364; 248/311.3
(58) Field of Search ..... 141/364, 106, 141/365–366, 98, 86–88; 248/311.3, 312, 312.1

(56) References Cited

U.S. PATENT DOCUMENTS

| | | | | |
|---|---|---|---|---|
| 2,767,744 A | | 10/1956 | Beerman | 141/319 |
| 3,266,533 A | | 8/1966 | McHale | 141/364 |
| 3,620,267 A | | 11/1971 | Seablom | 141/364 |
| 3,643,704 A | | 2/1972 | Carr | 141/106 |
| 3,963,063 A | | 6/1976 | Pascarella | 141/309 |
| 4,271,878 A | | 6/1981 | Bologa | 141/375 |
| 4,347,879 A | | 9/1982 | Blaser | 141/364 |
| 5,105,860 A | | 4/1992 | Connor | 141/106 |
| 5,146,957 A | | 9/1992 | Belokin, Jr. et al. | 141/1 |
| 5,413,152 A | * | 5/1995 | Burrows | 141/364 |

OTHER PUBLICATIONS

Advertisement of "Last Drop" bottle holder distributed by Compac Industries, Inc.—Obtained at the International Housewares Trade Show in Chicago in Jan., 2000.
Advertisement of "Big Foot" Bottle Inversion Cap distributed by Larien Products—Obtained at the International Housewares Trade Show in Chicago in Jan., 2000.
Advertisement obtained at Office Depot in May, 2000 and Web Site pages as printed on Jun. 29, 2000 of "The Last Drop" distributed by RS Destiny.
Web Site page for "Boddle Buddy" distributed by U.S. Iron Crafts as printed on Jun. 1, 2000.

* cited by examiner

*Primary Examiner*—Steven O. Douglas
(74) *Attorney, Agent, or Firm*—Dennis G. LaPointe; Mason & Associates, PA

(57) ABSTRACT

A holding device for collecting adjacent an outlet spout the residual contents from a container for eventual complete consumption of said residual contents, comprising a hollow rigid base portion; a flexible conical-shaped hollow upper portion; and the smaller first end aperture at the apex of the flexible conical-shaped upper portion being inserted into the upper end aperture of the rigid base portion and concentrically engaged with the upper edge of the base portion. The device further includes a plurality of concavities at a predetermined radially spaced apart relationship along a bottom edge of the base portion. [The upper portion is made from a foam rubber material and the rigid base portion is made from a plastic, a ceramic, a metal, a nylon, or a durable hard-rubber material].

27 Claims, 5 Drawing Sheets

HOLDING DEVICE FOR COLLECTING RESIDUAL CONTENTS IN A CONTAINER

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a holding device for collecting residual viscous fluids within a container to the cap-ends for eventual complete consumption of the container's contents.

2. Description of Related Art

Collection, drainage and transfer devices for containers holding viscous fluids are known in the art. However, none provide for versatile use of a single device which can be used in a daily routine where a product is normally placed for use such as in a refrigerator, including a refrigerator door, on a shelf within a tub enclosure or in a corner of the tub enclosure, on a shelf or floor of a shower enclosure, or in innumerable other places, wherein the holder of the container has the capability to hold most size and style containers holding consumable items such as shampoo, ketchup, mustard, relish, barbecue sauce, teriyaki sauce, oil, cosmetic creams and lotions, including suntan lotion, among numerous other household products. The height, width and shape of most household products are so diverse that no single device used for draining fluids is capable of holding several different inverted containers in a stable manner. Most consumers resort to leaning the container upside down against an adjacent wall or corner or between other containers in order to drain the contents near the cap end for eventual complete use. This process of balancing the inverted container can be time consuming and an irritation to the user. Any slight movement in the area often causes the container to tumble to a horizontal orientation, thereby frustrating the attempts to collect the contents and to minimize waste within the container, hence wasting consumer dollars.

Known related art includes an apparatus for draining fluid containers as depicted in U.S. Pat. No. 5,105,860 to Connor. This apparatus is fairly cumbersome and limited as to where it can be placed to be used as compared to the present invention. It does not have the ability to allow water that enters the interior surfaces of the apparatus to readily escape from the bottom of the apparatus should the apparatus be used in a shower. It primarily secures the cap instead of conforming to the size and shape of the container itself thereby not being as stable as the present invention. The apparatus cannot hold containers with a pointedly-shaped cap such as a mustard dispensing container, whereas the present invention solves this common problem. Most other known related art are primarily liquid transfer or dispensing devices which include U.S. Pat. No. 5,146,957 to Belokin, Jr. et al., U.S. Pat. No. 3,643,704 to Carr, U.S. Pat. No. 4,271,878 to Bologa, U.S. Pat. No. 3,266,533 to McHale, U.S. Pat. No. 2,767,744 to Beerman, U.S. Pat. No. 3,963,063 to Pascarella, U.S. Pat. No. 4,347,879 to Blaser, and U.S. Pat. No. 3,620,267 to Seablom.

None of the devices in the above references solve the problem of providing a compact device which can be used in a person's daily routine where product would normally be placed around the household such as in the kitchen, including in a refrigerator, and in a bathroom. The device of the present invention allows for the storage of consumable product within its own container in a ready for immediate use state and in such a manner as to minimize waste of product and time. Further, none of the related prior art provide for a device which can accommodate the innumerable shapes and styles of each container holding shampoos, lotions, creams, condiments, sauces, among countless other household products. Many dispensing containers also include pointed caps which limit the ability of a consumer to invert the container and lean it against an adjacent wall or corner in order to drain the residual contents near the cap end.

With the present invention, there is no need to attempt to transfer the residual from one container to another which can cause spillage, especially where cap sizes may vary. Instead, complete consumption from the original container is obtained without any effort other than to invert the bottle and store it in the present invention. The present invention can be placed on a refrigerator shelf or refrigerator door shelf without taking an undue amount of space. It can be placed in a shower area or tub area without creating a hazard, or being unsightly as a cylinder leaning against a wall or corner might appear.

Another object of the present invention would provide a device which is child safe, waterproof and sanitary, while providing a low cost household product to consumers to ensure the maximum use of consumable products. Consumers recognize that the wasted product that remains in a container and are disposed with the container is costly to the consumer and potentially harmful to the environment; however, many consumers prefer to dispose of such waste than to take the time to attempt to transfer residual contents from one container to another. Others do not want to deal with the mess that is sometimes created when transferring from one container to another, while others just do not want to spend the time watching a very slow process of drippage and drainage of viscous fluids from one container to another. The present invention solves these concerns and problems.

SUMMARY OF THE INVENTION

The present invention is a holding device for collecting adjacent an outlet spout the residual contents from a container for eventual complete consumption of said residual contents.

The preferred embodiment of the present invention comprises a rigid conical-shaped base portion and a flexible conical-shaped upper portion. The flexible conical-shaped upper portion is hollow and its apex end is inserted into the rigid base portion wherein it is concentrically engaged with the base portion by resting therein. Although the engagement between the upper and base portions may simply be the gravitational resting of the upper portion within the base portion hollow opening, the preferred engagement is adhesively engaging the outer surface of the flexible conical-shaped upper portion with the base portion at the point of contact near the upper edge of the base portion.

Although the preferred embodiment includes a rigid conical-shaped base portion, any shape base portion such as a rectangular, square, pyramidal or other shape, may be used with a hollow interior. However, material cost should be reduced with a conical-shaped rigid base portion. In addition, such a base in most cases require less space where used while maintaining adequate stability.

The preferred embodiment further includes a plurality of concavities or weep holes along the bottom edge of the base portion. Eventhough one or two concavities or weep holes would suffice, it would be more practical and efficient to provide a plurality of concavities or weep holes ranging from 30° to 90° apart. Although the concavities or weep holes could be closer, their functionality would probably not improve significantly, if at all, over concavities or weep holes spaced 30° to 45° apart. This feature allows for drainage of water from condensation on the outer surface of a container or from a shower that sprays the outer surface of the bottle whereby the water drips along the surfaces of the bottle and along the inside surfaces of the device. The water can escape through the plurality of concavities to maintain the device dry and sanitary.

Another embodiment of the present invention includes a cylindrical-shaped base portion instead of a conical-shaped base portion. An alternative method of engaging the flexible upper portion to the rigid cylindrical-shaped base portion is accomplished by inserting an annular ring from the inside surface of the upper portion of tightly engage and compress the flexible upper portion against the inside surface of the base portion near the base portion's upper edge. Although there are several other possible engagement means known in the art, adhesive engagement is believed to be more practical and cost effective to ensure minimal production cost and consequential lower cost to the consumer.

The rigid base portion can be made of several materials which can be easily handled, cleaned and sanitized with minimal chances of breakage. Preferably, a plastic, a nylon, or a durable hard rubber material is used. A metal material may also be used. These materials can be decoratively designed and painted to enhance the interior design of a kitchen or bathroom. Ceramic may also be used; however, it is not a preferred material as breakage could result if the device is mishandled.

The flexible conical-shaped upper portion is preferably made of a foam rubber material that can form to the shape of most size and style containers, although it can be made from a flexible rubber or flexible plastic material. The inherent gripping properties of such material thereby ensure greater stability and balance while holding the container in an inverted orientation.

Although it may not be necessary in most cases, depending on the material, thickness of material, and shape chosen for the rigid base portion, a non-skid material may be adhesively applied to the bottom surface of the rigid portion to assist in the prevention of sliding on a smooth surface such as a shelf in a fiberglass tub or shower enclosure.

The principal object of the invention is to provide a device which is child safe, sanitary, easy to clean, easy to use with no extra effort by the consumer and minimizes waste thereby reducing cost to the consumer as well as waste disposal cost and environmental cost.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
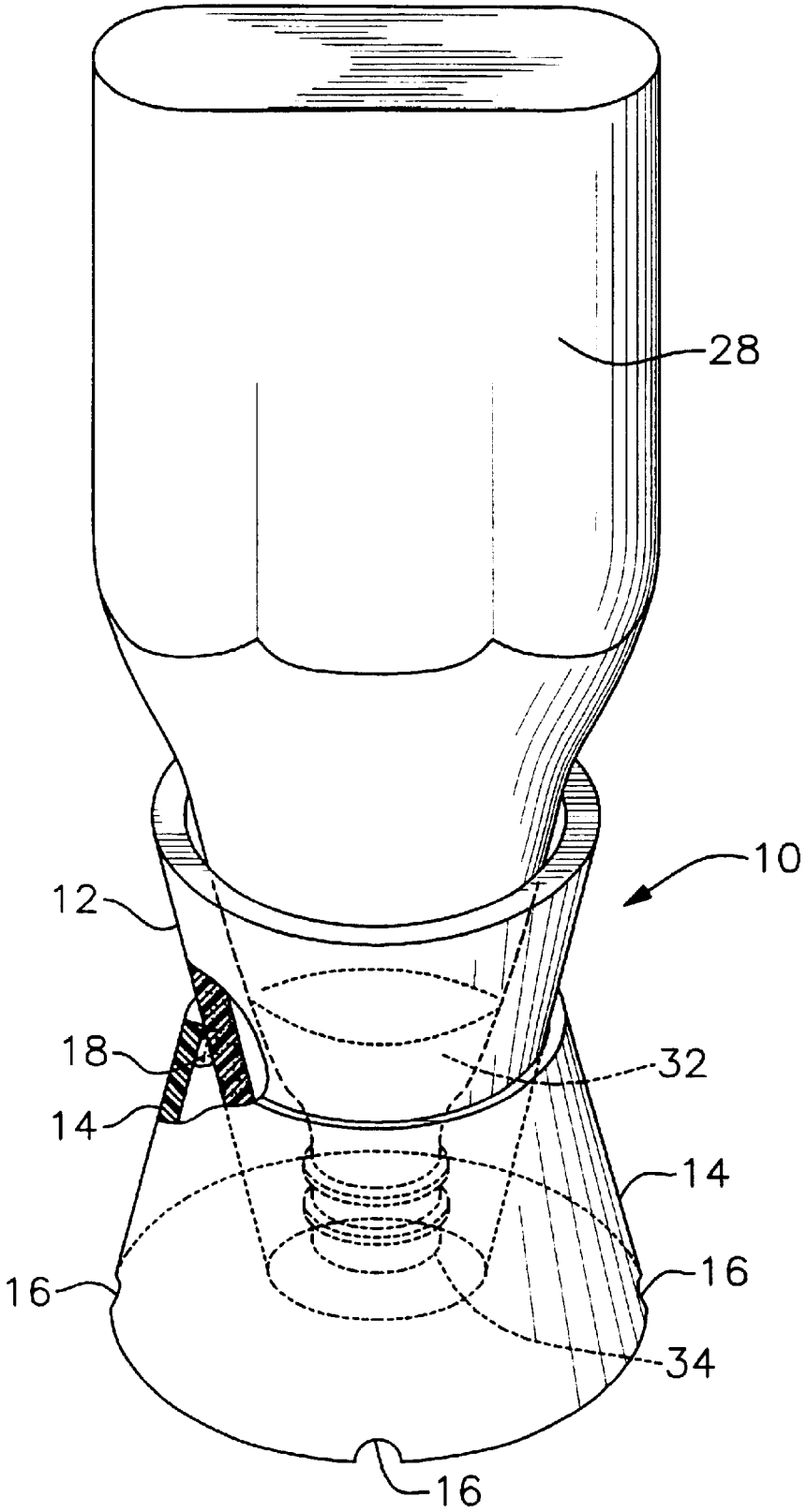
FIG. 1 is a perspective view of the device depicting the preferred embodiment of the present invention with a container resting within the device's flexible upper portion.
Figure 2:
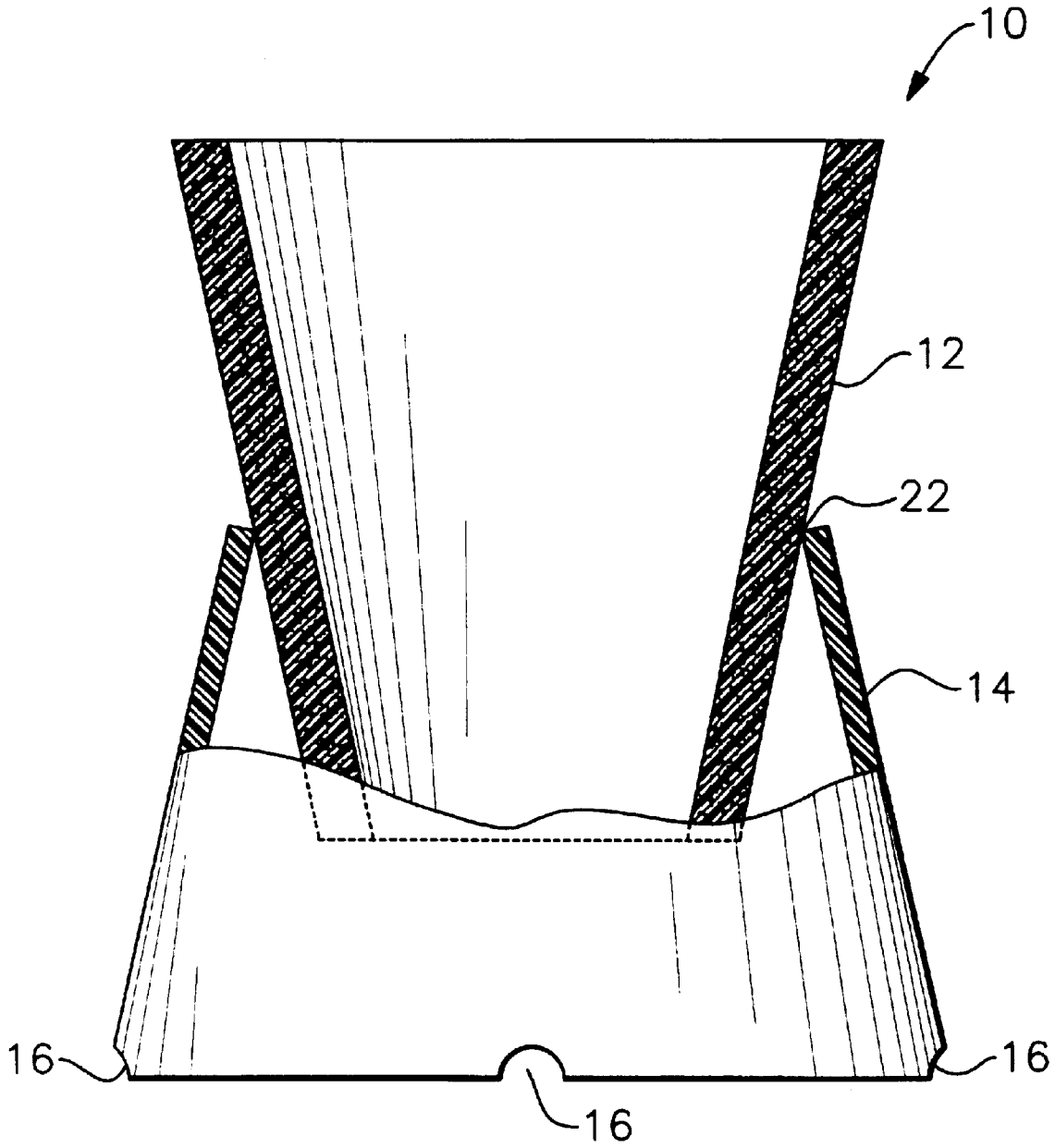
FIG. 2 is an elevational partial cross-sectional view of the device depicting the flexible upper portion resting within the rigid base portion without being adhesively attached to the base portion.

Referring now to the drawings, in particular FIGS. 1–2, the invention which is a holding device for collecting adjacent an outlet spout the residual contents from a container for eventual complete consumption, depicted generally as 10, comprises a rigid base portion 14, preferably a conical-shaped base portion; the rigid base portion 14 having a conical-shaped hollow interior therethrough thereby having a first end aperture greater than a second end aperture at an apex of the conical-shaped interior of the base portion 14; a flexible conical-shaped upper portion 12; the flexible conical-shaped upper portion 12 being hollow therethrough and having a first end aperture at an apex of the flexible conical-shaped upper portion smaller than a second end aperture; and the smaller first end aperture at the apex of the conical-shaped upper portion 12 being inserted into the second end aperture of the rigid base portion 14 and concentrically engaged within the smaller second end aperture of the base portion 14 [by resting therein] at 22.

The base portion 14 further comprises at least one, although a plurality is preferred, of concavities 16 at a predetermined radially spaced apart relationship along an edge of the base portion 14 at the first end aperture of the rigid base portion 14.

The flexible conical-shaped upper portion 12 is made of a foam rubber material and the rigid conical-shaped base portion 14 is made of a plastic, a ceramic, a metal, a nylon, or a durable hard-rubber material.

The flexible conical-shaped upper portion 12 [is] *can be* adhesively engaged 18 with the rigid base portion 14 juxtaposed the rigid base portion 14 second end aperture.

FIG. 1 depicts a container 28 such as a ketchup bottle or mustard bottle invertedly resting within the device wherein the residual contents 28 have collected near an outlet spout 34 or the cap end of the container 28.

Although the overall dimensions of the device can vary to accommodate almost any size or shape container, the typical device 10 which would accommodate most household food and cosmetic products would have an approximate overall height in the range of 3¾ to 4¾ inches with the base portion 14 height being approximately 2 inches to 2½ inches. The flexible conical-shaped upper portion 12 is typically about 3¼ to 3¾ in height and typically extends about 2 inches above the upper edge of the rigid base portion 14 *to provide additional stability to some of the larger bottles, but such an extension is not necessary for most bottles*. The inside diameter of the uppermost end of the flexible conical-shaped upper portion 12 is typically about 2¼ inches to 3 inches and the inside diameter at the [ower] *lower* apex end of the flexible conical-shaped upper portion 12 is typically about 1¼ to 1⅝ inches. The foam rubber material used for the flexible conical-shaped upper portion 12 is typically about 3/16 inches to 5/16 inches thick. The conical-shaped base portion 14 typically has an outside base portion 14 diameter at its bottom end of approximately 3 inches to 3⅜ inches and an inside base portion 14 diameter at its uppermost end of approximately 2 inches to 2⅜ inches. The concavities 16 along an edge of the base portion 14 are typically an opening with a radius of about ⅛ inch.

Figure 3:
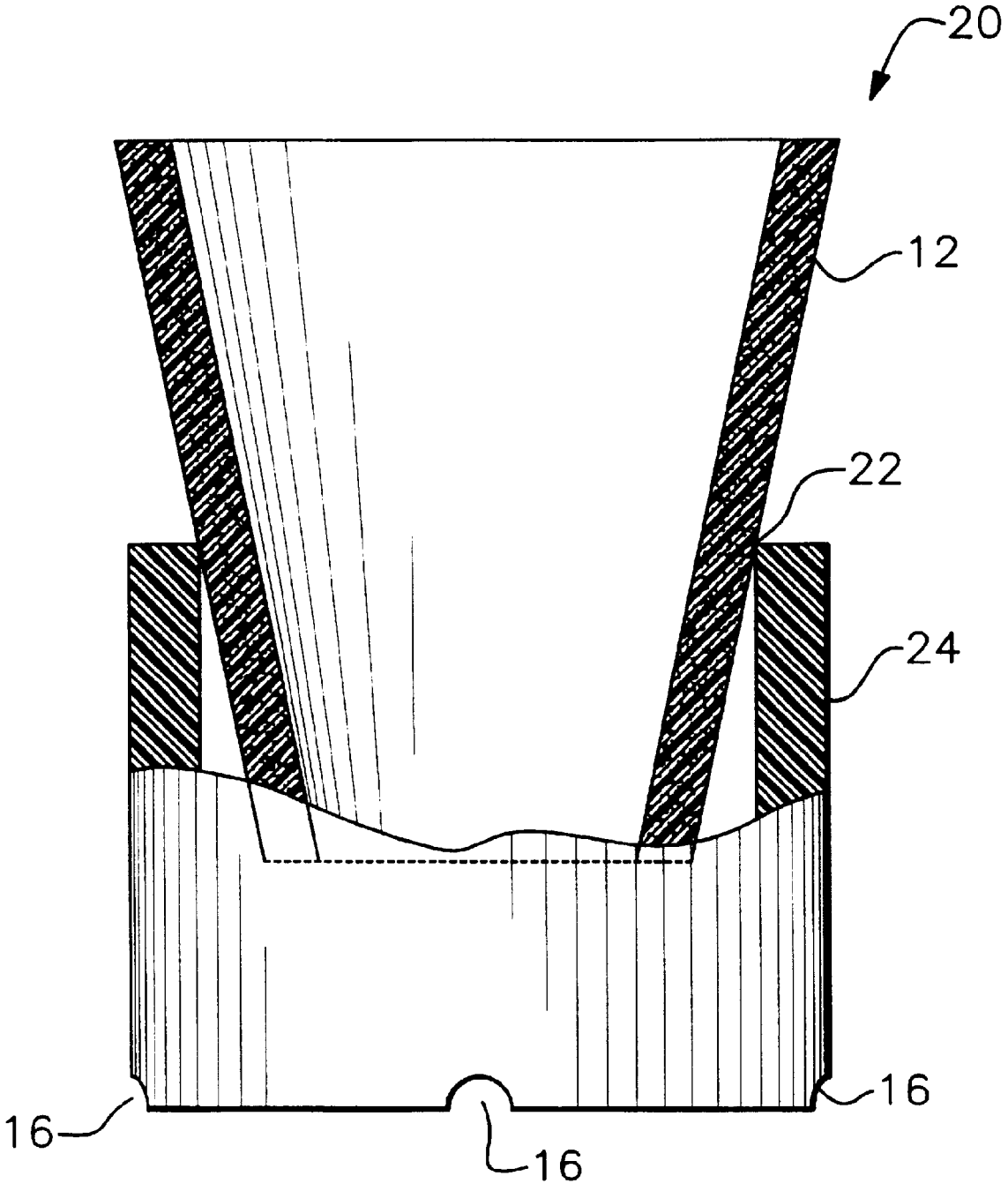
FIG. 3 is an elevational partial cross-sectional view of the device depicting a cylindrical-shaped rigid base portion and the flexible upper portion resting within the rigid base portion without being adhesively attached to the base portion.
Figure 4:
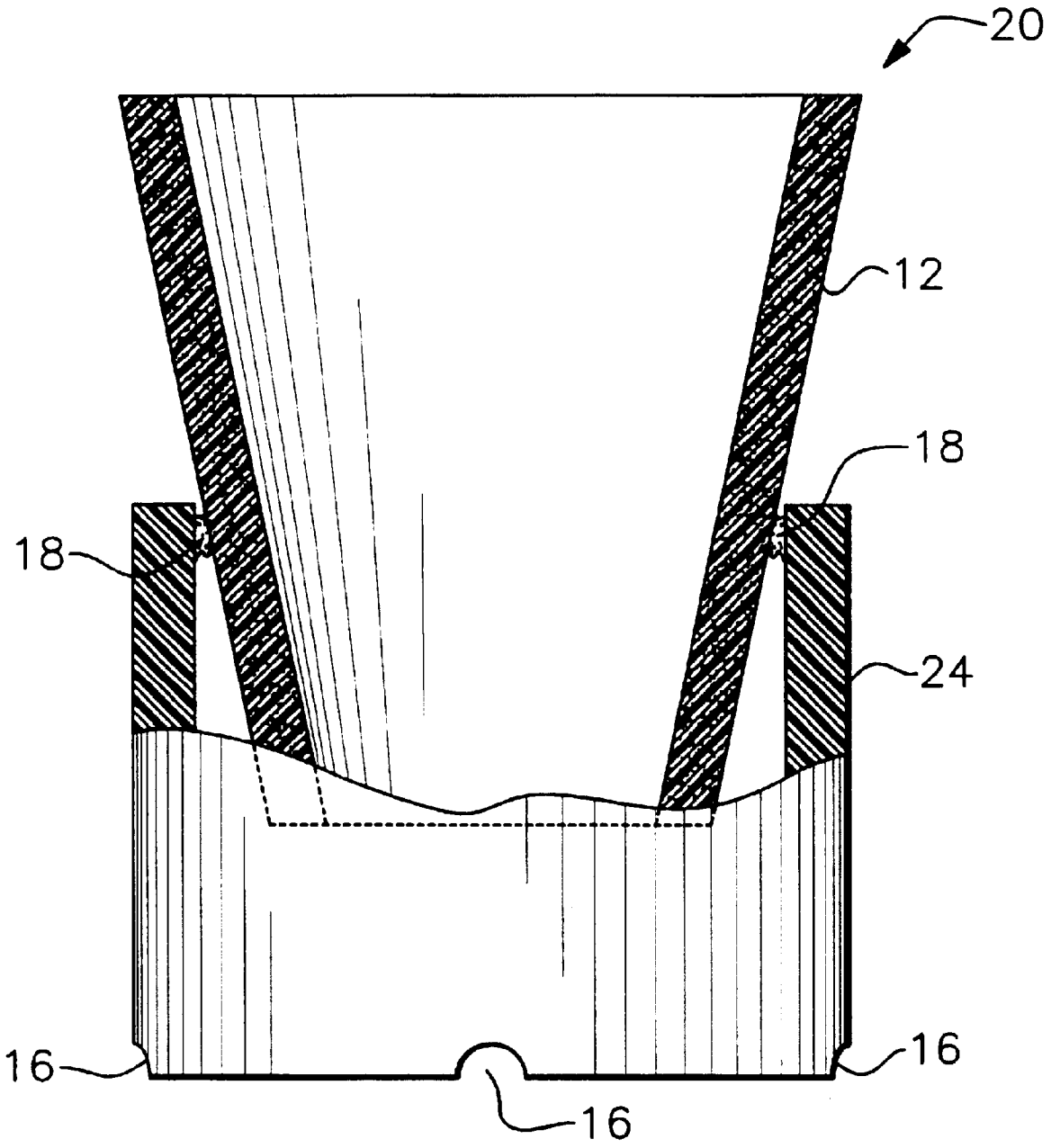
FIG. 4 is an elevational partial cross-sectional view of the device depicting a cylindrical-shaped rigid base portion and the flexible upper portion being adhesively attached to the rigid base portion.

Another embodiment of the invention is depicted as 20 in FIGS. 3–4, wherein the rigid conical-shaped base portion 14 of the above preferred embodiment is replaced with a cylindrical-shaped base portion 24. FIG. 3 depicts the flexible conical-shaped upper portion 12 resting within the rigid base portion 24 with a resting frictional engagement 22 between the upper portion 12 and the base portion 24. FIG. 4 depicts the embodiment of the present invention as shown in FIG. 3 except that the upper portion 12 is adhesively engaged 18 with the base portion 24.

Figure 5:
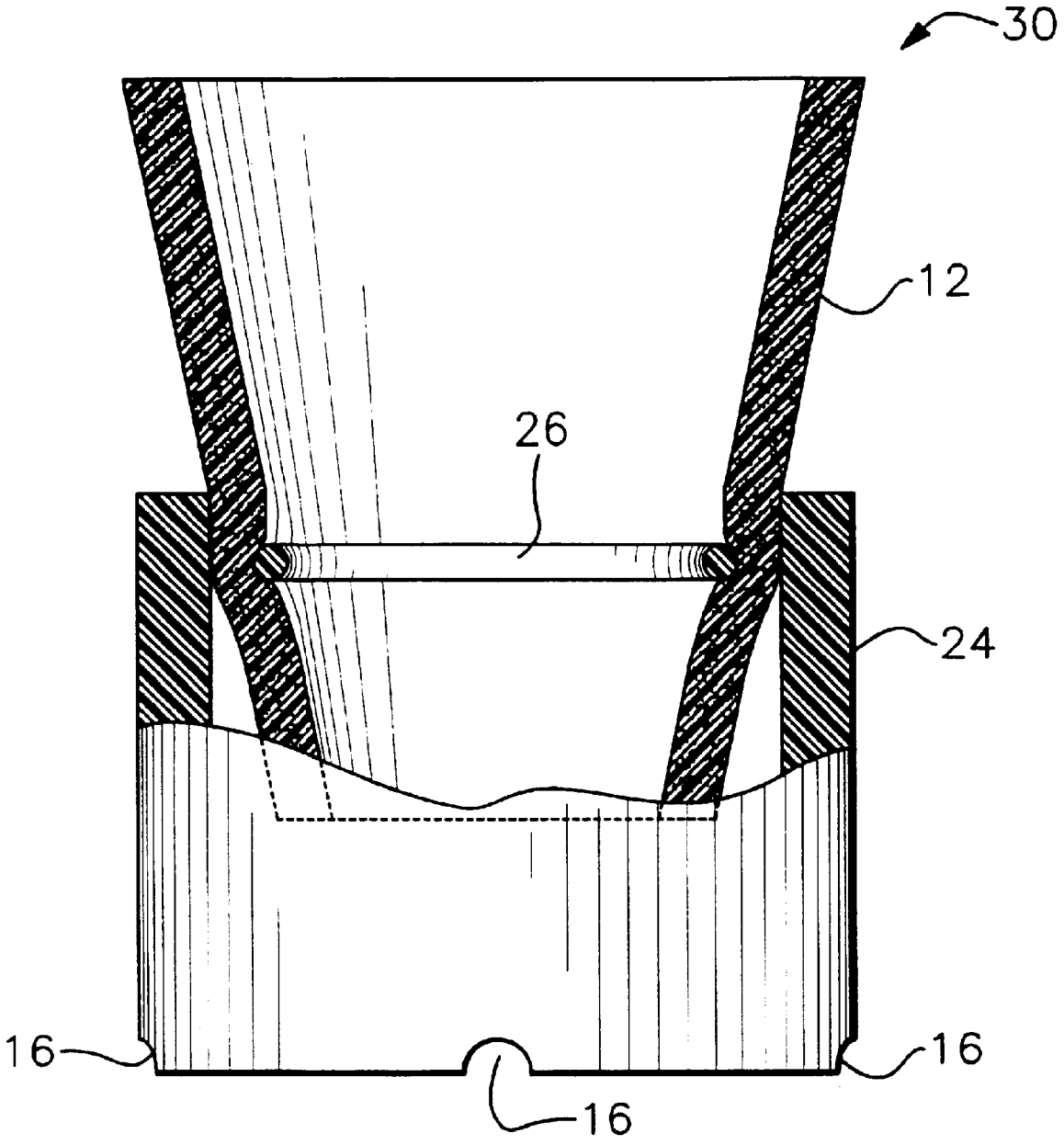
FIG. 5 is an elevational partial cross-sectional view of the device depicting a cylindrical-shaped rigid base portion and the flexible upper portion being attached to the rigid base portion with an annular ring.

Another embodiment of the present invention is depicted in FIG. 5, wherein the device which is generally depicted as 30, includes an annular ring 26 which compresses the upper portion 12 against the inside surface of the rigid cylindrical-shaped base portion 24.

As seen from the foregoing description, the present invention satisfies a long felt need to provide a device which is practical for everyday routine use around a house for maximizing the consumption of the contents or viscous fluids within a container.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for collecting adjacent an outlet spout residual contents from a container for eventual complete consumption of said residual contents, comprising:

a rigid base portion;

the rigid base portion having a conical-shaped hollow interior therethrough thereby having a first end aperture greater than a second end aperture at an apex of the conical-shaped interior of the base portion;

a flexible conical-shaped upper portion;

the flexible conical-shaped upper portion being hollow therethrough and having a first end aperture at an apex of the flexible conical-shaped upper portion smaller than a second end aperture; and the smaller first end aperture at the apex of the conical-shaped upper portion being inserted into the second end aperture of the rigid base portion and concentrically engaged within the smaller second end aperture of the base portion by resting therein.

2. A device according to claim 1 further comprising a plurality of concavities at a predetermined radially spaced apart relationship along an edge of the base portion at the first end aperture of the rigid base portion.

3. A device according to claim 1, wherein the flexible conical-shaped upper portion is made from a foam rubber material.

4. A device according to claim 1, wherein the rigid base portion is made from a plastic, a ceramic, a metal, a nylon or a durable hard-rubber material.

5. A device according to claim 1, wherein the flexible conical-shaped upper portion is adhesively engaged with the rigid base portion juxtaposed the rigid base portion second end aperture.

6. A device according to claim 1 wherein the rigid base portion is conical-shaped.

7. A device for collecting adjacent an outlet spout residual contents from a container for eventual complete consumption of said residual contents, comprising:

a rigid base portion;

the rigid base portion having a cylindrical-shaped hollow interior therethrough thereby having a first end aperture and a second end aperture above said first end aperture;

a flexible conical-shaped upper portion;

the flexible conical-shaped upper portion being hollow therethrough and having a first end aperture at an apex of the flexible conical-shaped upper portion smaller than a second end aperture; and the smaller first end aperture at the apex of the conical-shaped upper portion being inserted into the second end aperture of the rigid base portion and concentrically engaged within the second end aperture of the base portion by resting therein.

8. A device according to claim 7 further comprising a plurality of concavities at a predetermined radially spaced apart relationship along an edge of the base portion at the first end aperture of the rigid base portion.

9. A device according to claim 7, wherein the flexible conical-shaped upper portion is made from a foam rubber material.

10. A device according to claim 7, wherein the rigid base portion is made from a plastic, a ceramic, a metal, a nylon, or a durable hard-rubber material.

11. A device according to claim 7, wherein the flexible conical-shaped upper portion is adhesively engaged with the rigid base portion juxtaposed the rigid base portion second end aperture.

12. A device according to claim 7, wherein the rigid base portion is cylindrical-shaped.

13. A device according to claim 7, wherein the flexible conical-shaped upper portion is tightly engaged with the rigid base portion juxtaposed the rigid base portion second end aperture with an annular ring, wherein the ring is inserted inside the flexible conical-shaped upper portion and therein compresses the upper portion against an inside wall surface of the rigid base portion.

*14. A device according to claim 7, wherein the flexible conical-shaped upper portion extends above the rigid base portion after insertion and engagement of the upper portion and the rigid base portion, the extended portion for providing additional stability to a container.*

*15. A device according to claim 7, wherein the flexible conical-shaped upper portion and the rigid base portion are made from plastic materials.*

*16. A device according to claim 7, wherein the flexible conical-shaped upper portion and the rigid base portion are made from rubber materials.*

*17. A device according to claim 1, wherein the flexible conical-shaped upper portion extends above the rigid base portion after insertion and engagement of the upper portion and the rigid base portion, the extended portion for providing additional stability to a container.*

*18. A device according to claim 1, wherein the flexible conical-shaped upper portion and the rigid base portion are made from plastic materials.*

*19. A device according to claim 1, wherein the flexible conical-shaped upper portion and the rigid base portion are made from rubber materials.*

*20. A device for collecting adjacent an outlet spout residual contents from a container for eventual complete consumption of said residual contents, comprising:*

*a rigid base portion;*

*the rigid base portion having a conical-shaped hollow interior therethrough thereby having a first end aperture greater than a second end aperture at an apex of the conical-shaped interior of the base portion;*

*a flexible conical-shaped upper portion;*

*the flexible conical-shaped upper portion being hollow therethrough and having a first end aperture at an apex of the flexible conical-shaped upper portion smaller than a second end aperture; and*

*the smaller first end aperture at the apex of the conical-shaped upper portion being inserted into the second end aperture of the rigid base portion and concentrically engaged within the smaller second end aperture of the base portion.*

*21. A device according to claim 20, wherein the flexible conical-shaped upper portion extends above the rigid base portion after insertion and engagement of the upper portion and the rigid base portion, the extended portion for providing additional stability to a container.*

*22. A device according to claim 20, wherein the flexible conical-shaped upper portion and the rigid base portion are made from plastic materials.*

*23. A device according to claim 20, wherein the flexible conical-shaped upper portion and the rigid base portion are made from rubber materials.*

*24. A device for collecting adjacent an outlet spout residual contents from a container for eventual complete consumption of said residual contents, comprising:*

*a rigid base portion;*

*the rigid base portion having a cylindrical-shaped hollow interior therethrough thereby having a first end aperture and a second end aperture above said first end aperture;*

*a flexible conical-shaped upper portion;*

*the flexible conical-shaped upper portion being hollow therethrough and having a first end aperture at an apex of the flexible conical-shaped upper portion smaller than a second end aperture; and*

*the smaller first end aperture at the apex of the conical-shaped upper portion being inserted into the second end aperture of the rigid base portion and concentrically engaged within the second end aperture of the base portion.*

*25. A device according to claim 24, wherein the flexible conical-shaped upper portion extends above the rigid base portion after insertion and engagement of the upper portion and the rigid base portion, the extended portion for providing additional stability to a container.*

*26. A device according to claim 24, wherein the flexible conical-shaped upper portion and the rigid base portion are made from plastic materials.*

*27. A device according to claim 24, wherein the flexible conical-shaped upper portion and the rigid base portion are made from rubber materials.*

* * * * *